May 7, 1963     H. C. CAMPBELL     3,088,345
KITCHEN UTENSIL
Filed Dec. 19, 1960

INVENTOR.
HOMER C. CAMPBELL
BY
ATTORNEYS

United States Patent Office 3,088,345
Patented May 7, 1963

3,088,345
KITCHEN UTENSIL
Homer C. Campbell, 1434 Cherry St., Denver, Colo.
Filed Dec. 19, 1960, Ser. No. 76,766
3 Claims. (Cl. 81—1)

This invention relates to a kitchen utensil; and more particularly to a utensil constructed and arranged for use with a power garbage disposer of the type installed in residential kitchens.

In recent years, the electric garbage disposer has become a more or less common kitchen accessory, and is used to some extent by all the residents, regardless of age. In some instances, persons attempting to force waste material into the disposer have used their hands and suffered injuries by contact with the rotor. Others have used kitchen utensils such as knives, spoons, etc., with resultant damage to the utensil or the disposer blades and other parts of the disposer assembly, and sometimes personal injuries result.

My invention provides a new kitchen utensil which is particularly adapted to force waste material into an automatic garbage disposer and is so constructed as to be incapable of contacting disposer blades or other moving parts therein, thereby preventing injury to users or equipment while effectively forcing such material into the disposer.

A kitchen utensil embodying my inventive concepts may comprise an elongated main support portion having a manipulating handle adjacent one end and an enlarged pushing portion at the other end, and having a stop intermediate the ends thereof for limiting the extent of penetration of the pushing portion. The stop preferably is integrally attached to the support and in all arrangements the distance therefrom to the bottom of the support is slightly less than the depth of a disposer well so as to space the bottom of the utensil above the top surfaces of the rotor at the limit of penetration.

It is among the objects of my invention to provide a new kitchen utensil which is particularly adapted for use with a garbage disposer of the automatic type; and which is simple in construction, durable, relatively inexpensive, and easily operated without special instructions or the like.

It is another object to provide a kitchen utensil for forcing waste material down onto the blades of an automatic garbage disposer without contact between the utensil and moving disposer parts to thereby safeguard young children and/or careless persons inclined to use their hands or extraneous devices for similar purposes with likelihood of resultant injury and damage.

Other objects reside in details of construction, as well as features and advantages inherent in a kitchen utensil according to my concepts, as will become increasingly evident to those skilled in the art from a study of the following detailed description of the appended exemplary drawings. In these drawings.

Figures 1, 2, 3:
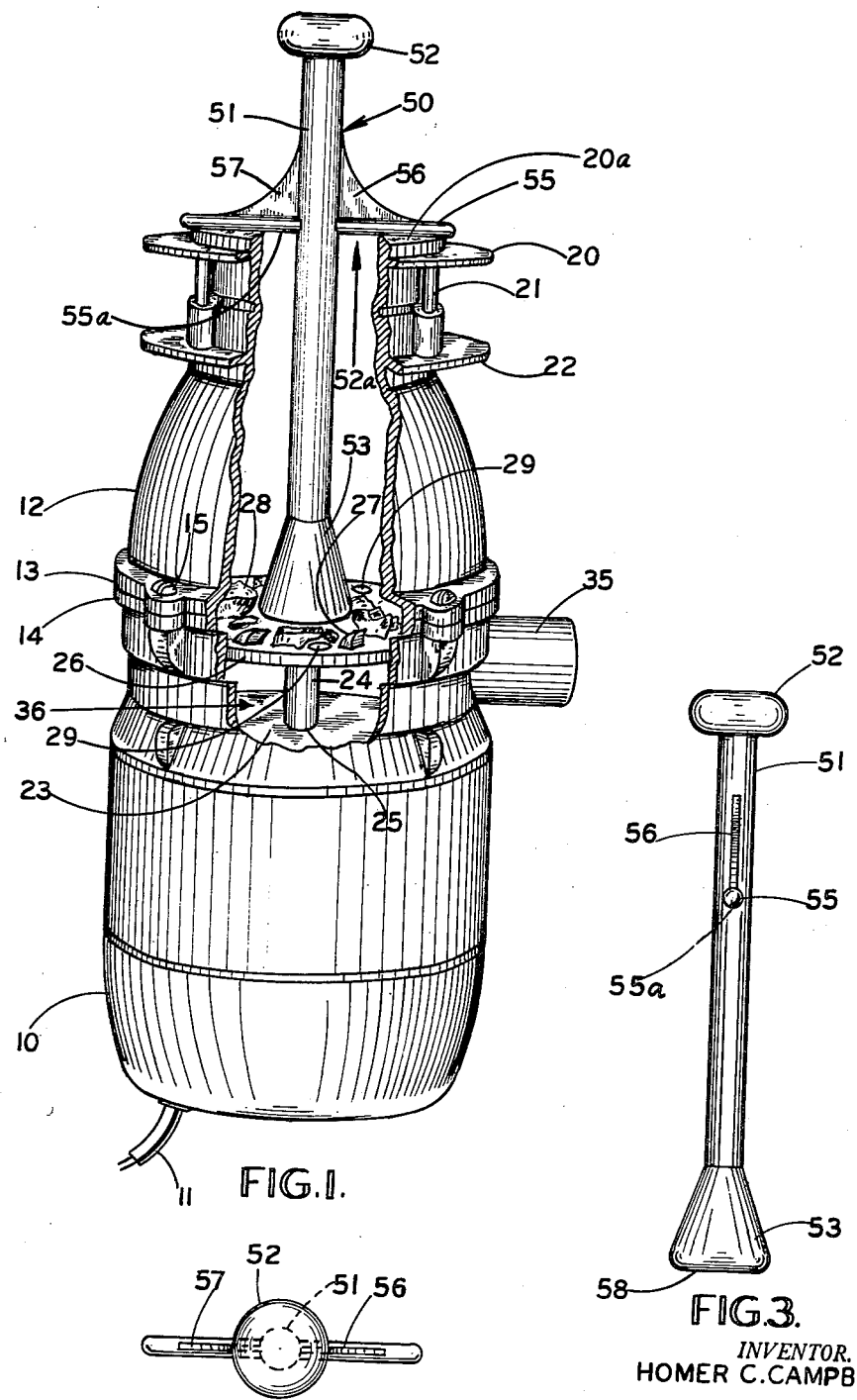
FIG. 1 is a side elevation in partial section of an automatic garbage disposer with a kitchen utensil according to my invention shown in operative position.
FIG. 2 is a top view of the utensil shown in FIG. 1.
FIG. 3 is a side elevation of the utensil of FIG. 1 positioned at ninety degrees to its position in FIG. 1.

Before describing the drawings in detail, I wish it understood they are but exemplary of suitable design within my inventive concepts and that the spirit and scope of my invention is to be as defined in the hereafter set forth claims.

Referring to the drawings, a typical automatic electric garbage disposer is comprised essentially of a lower motor casing section 10 having a suitable A.C. electric motor encased therein. Since motors of this type are well known, one has not been shown in the drawings. An electric conduit 11 is connected through the casing 10 with the motor and normally has a switch (not shown) in its circuit for off and on operation of the disposer. Mounted above the motor casing 10 is an upper casing section 12 normally of a downwardly facing, bell-shaped configuration. The upper and lower casings are attached through mating flanges 13 and 14 by screws 15 or the like. A sink drain flange 20 is interconnected through elongated bolts 21 with a flange 22 on the upper peripheral portion of the casing section 12. A stationary plate 23 is mounted above the motor in lower casing 10 and is in a watertight relationship thereto so as to provide a seal for a watertight chamber 36 thereabove.

A vertically extending rotary shaft 24 passes through a suitable watertight bearing assembly (not shown) and an aperture 25 in the plate 23. A rotatable plate 26 is mounted adjacent the upper end of shaft 24 and carries a plurality of cutter blades 27 for disintegrating waste food material or the like 28. A plurality of apertures 29 in plate 26 are distributed between cutting blades 27 to permit discharge of disintegrated waste material and water into the lower chamber 36. A conduit 35 discharges the contents of chamber 36 and is connected into the home waste system for disposal of disintegrated waste material and water.

A kitchen utensil 50 constructed according to my invention is shown in operative position within the above described garbage disposer. It is comprised essentially of an elongated main support portion or section 51 and has an enlarged knob 52 integrally attached near its upper end to serve as a grip or manipulating handle for the utensil. The opposite or lower material contacting or pushing end 53 of the support member 51 is enlarged and preferably of a generally truncated conical shape. A web or stop member 55 is attached to the support member 51 intermediate its ends and is mounted normal to the longitudinal axis of the member 51. Brace members 56 and 57 are included for strengthening the assembly.

The stop 55 preferably is mounted centrally of the support member 51 and is of a diameter less than that of the member 51 (FIGS. 3 and 4). Its length is substantially greater than the diameter of the entrance opening 52a to the disposer chamber to provide an absolute limit on penetration. This arrangement permits rapid ingress of water and waste material through the sink drain inlet 52a. Likewise, the braces 56 and 57 are relatively thin and centrally located on the upper surface of web 55 so there is as little obstruction to flow of waste material and water as possible.

The lower member 53 has a substantially flat bottom surface 58 for the purpose of mashing and forcing waste material into contact with the blades 27 of a disposer when the device is in operation. The length of the web 55 and the distance from the undersurface 55a thereof to the lower surface 58 of the member 53 are critical. The length of web 55 must be at least slightly greater than the diameter of a kitchen drain 52a to prevent the utensil 50 passing therethrough, and the distance from the underside 55a of the web or stop to the undersurface 58 of the member 53 must be less than the distance from the upper surface 20a of the kitchen drain 52a to the top surfaces of the blades 27.

In a preferred embodiment, the foregoing dimensions are on the order of a 4 inch length for the web and a 5.5 inch distance from the undersurface of the web to the surface 58 of member 53. In my preferred construction, the entire kitchen utensil 50 will be integrally cast as a one-piece unit and may be made of any suitable composition, such as a lightweight, inexpensive plastic or metal. Also, as should be clear from the drawings, the diameter of the manipulating member or handle 52 and the greatest diameter of the member 53 are substantially equal, thereby providing a more economical mold construction.

In operation, waste material, garbage and the like is forced through the drain opening 52a by exerting a downward movement to the utensil 50, and the surface 58 is pushed into close association with the rotating blades 27 of a disposer. Because of the construction features just described it is not possible to force the utensil 50 into contact with the blades. Movement of the utensil in a plane perpendicular to that showing in FIG. 1 will result in a tilting on an end of the web 55, causing the lower portion 53 thereof to move through an arc in a vertical plane, the lowest curve of which will always be above the blades 27. Rotation of the utensil with the web or stop seated on surface 20a will provide a rotation of bottom surface 58 in an arc in which the lowest portion thereof will always be above the cutting blades 27. And likewise, movements through any intermediate plane will also result in the lower surface 58 scribing an arc, the lower portion of which will always be above the cutting blades 27.

From the foregoing description it will be apparent that the utensil of my invention provides an effective means for feeding waste material into a disposer and cannot be manipulated to assume a position which might result in damage to the disposer mechanism or injury to the user.

Having thus described my invention with sufficient particularity and detail as to enable those skilled in the art to practice it, what I desire to have protected by Letters Patent is set forth in the following claims.

I claim:
1. As an article of manufacture for use with an automatic garbage disposer having an inlet spaced a distance above its cutting elements, a kitchen utensil comprising an elongated relatively thin support portion and having a manipulating handle adjacent one end and an enlarged tamping member adjacent its other end, said tamping member being of a generally truncated conical configuration and having an enlarged planar bottom surface, there being a stop attached intermediate the ends of said support portion with its lower extremities disposed in a plane substantially normal thereto and spaced above said planar surface a distance less than the distance from the inlet of said garbage disposer to the cutting blades thereof, said stop being a web-like member of substantial length relative to cross-section and said cross-section being sufficiently small to provide a substantial area of direct and open communication from one side of said web to the other whereby substantially uninterrupted and direct ingress of materials may be had to a garbage disposer with which it is used.

2. The article defined in claim 1 in which the lateral extent of said stop is at least 4 inches.

3. The article defined in claim 1 in which the distance from said stop to said lower planar surface is at least 5.5 inches.

References Cited in the file of this patent
UNITED STATES PATENTS

| | | |
|---|---|---|
| 2,066,997 | Mueller | Jan. 5, 1937 |
| 2,905,036 | Ledford | Sept. 22, 1959 |

FOREIGN PATENTS

| | | |
|---|---|---|
| 803,339 | Germany | Apr. 2, 1951 |